June 18, 1929.  R. L. SKINNER  1,717,741
COMBINED OIL RECTIFIER AND FILTER
Filed Oct. 14, 1927   3 Sheets-Sheet 1
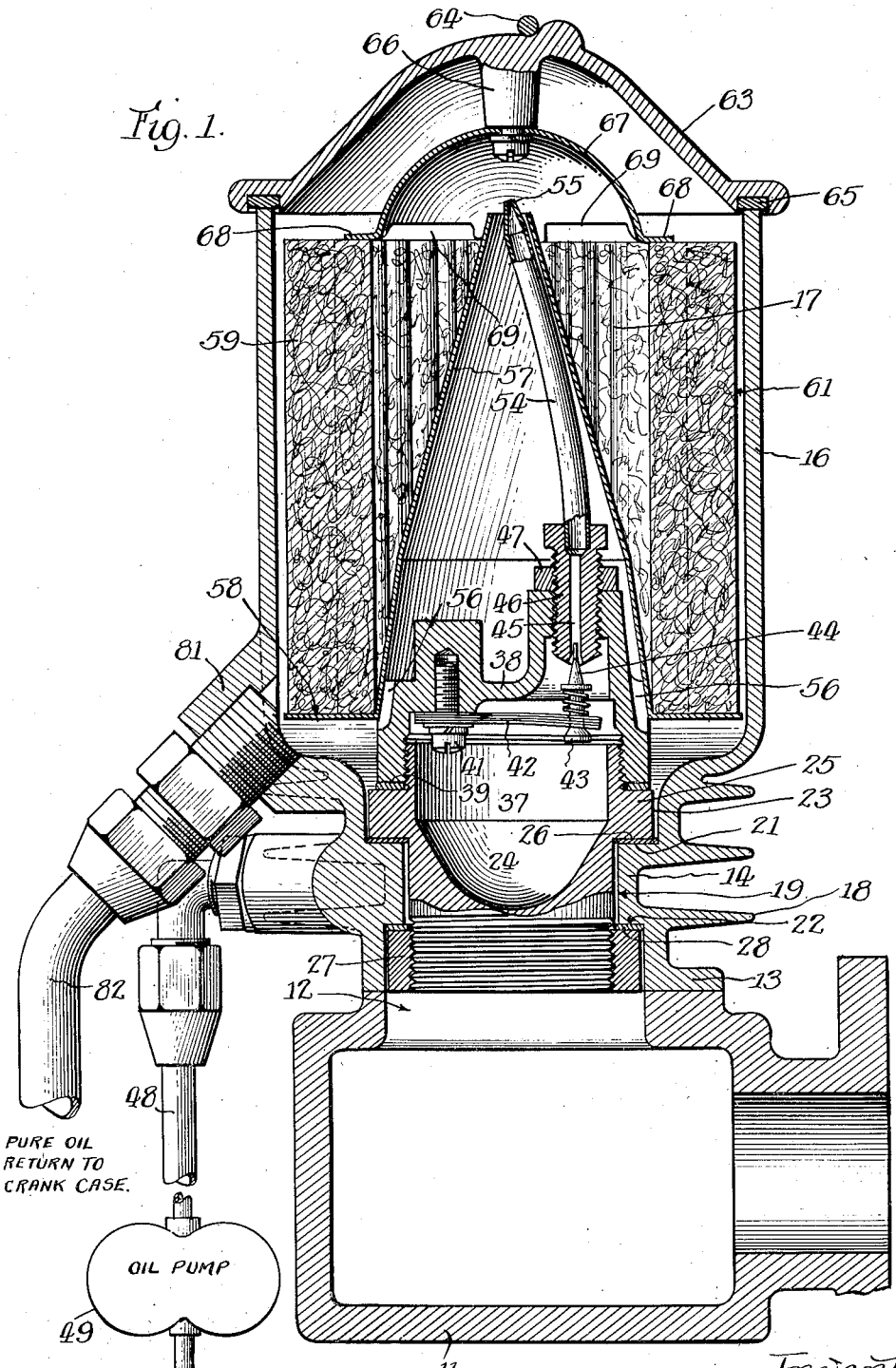

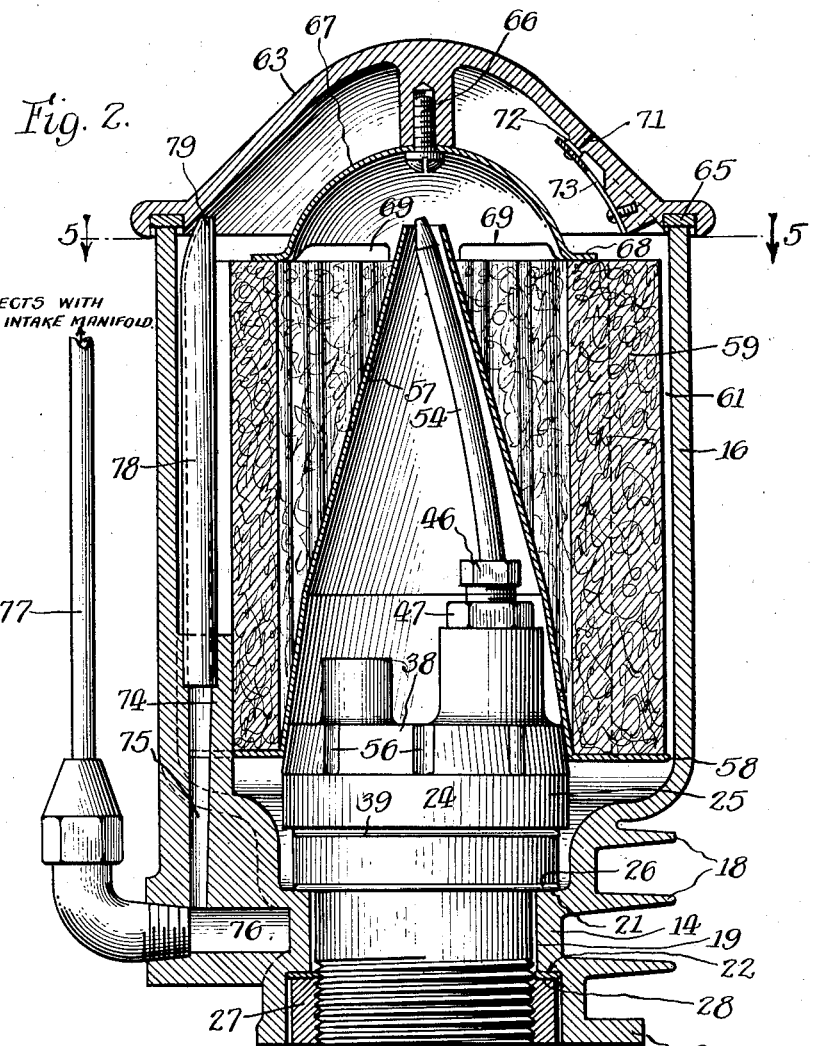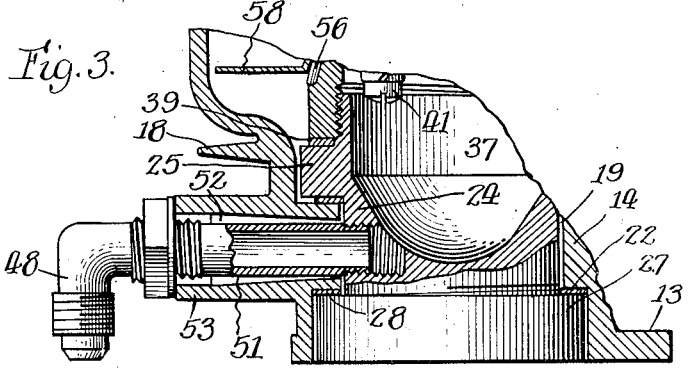

June 18, 1929.  R. L. SKINNER  1,717,741
COMBINED OIL RECTIFIER AND FILTER
Filed Oct. 14, 1927   3 Sheets-Sheet 3
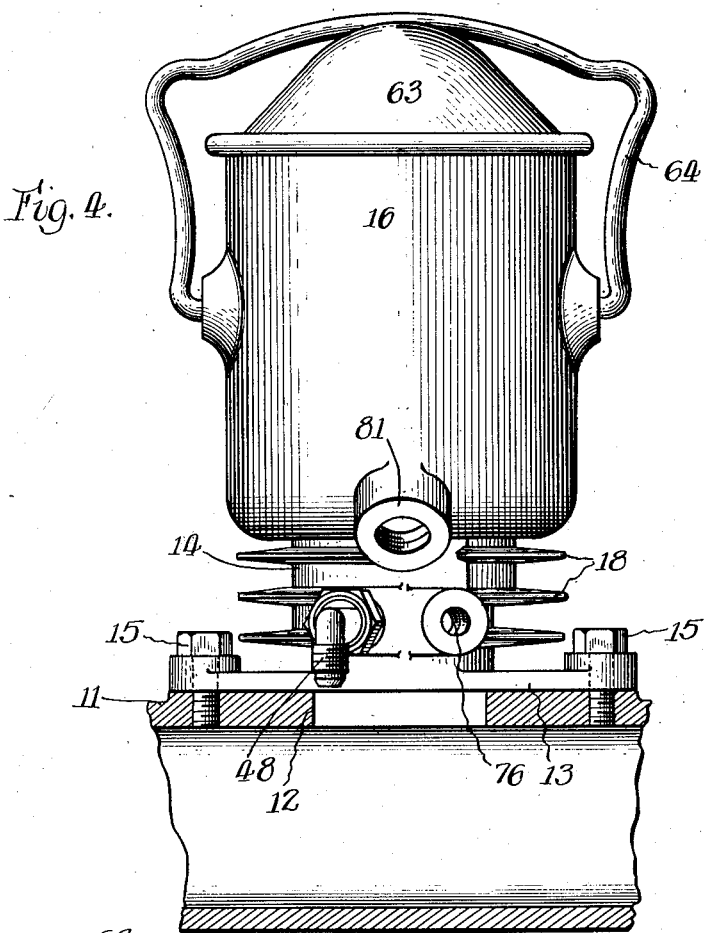
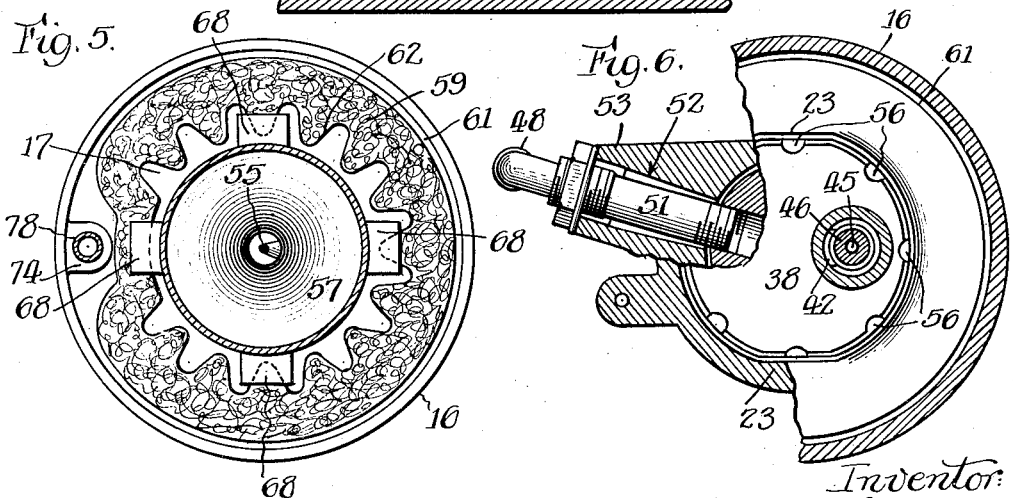

Patented June 18, 1929.

1,717,741

UNITED STATES PATENT OFFICE.

RALPH L. SKINNER, OF DETROIT, MICHIGAN, ASSIGNOR TO SKINNER AUTOMOTIVE DEVICE CO., INC., OF DETROIT, MICHIGAN, A CORPORATION OF CALIFORNIA.

COMBINED OIL RECTIFIER AND FILTER.

Application filed October 14, 1927. Serial No. 226,091.

The present invention relates to improved and novel means for purifying or reclaiming impure or used lubricating oil and returning the rectified oil to the lubricating system of the internal-combustion engine, from which the contaminated oil was originally withdrawn for the purpose of freeing it from liquid, gaseous and mechanical impurities.

The pollution of the lubricating oil of an internal-combustion motor occurs most rapidly when the cold engine is first started, at which time the volatile, gaseous fuel comparatively easily condenses and escapes past the pistons into the oil supply in the crank-case.

What has been said above about the impairing of the oil by liquid fuel also applies to the impurity, water, because experience has demonstrated that the presence of water in the oil is particularly detrimental owing to the corrosive and etching effects on the metal parts of the engine caused by an acid in the production of which the water forms an important constituent.

The new combined rectifier and filter includes a suitable filtering medium through which the oil flows only while adequately hot for the mechanical removal of undesirable foreign particles, such as carbon, dust, etc., and the structure is so planned and designed that, when the engine is stopped, all of the oil drains through the filter by gravity while the oil is still hot, and is returned immediately to the crank-case supply, so that even though the automobile may become quite cool before the engine is again started, the filter cannot become clogged or filled up with congealed or unduly thick oil or frozen water in or on it.

Another feature of the improved apparatus is the constant delivery of the purified, filtered oil back to the engine supply by gravity only, even though the rectification of the oil is performed under partial vacuum to facilitate the liberation of its impurities, and without intermediate storage or the use of a float.

Many other advantages in the employment of the new appliance will become apparent to those skilled in the art from a consideration of the preferred embodiment of the invention illustrated in the accompanying drawings forming a part of this specification, and throughout the several views of which like reference numerals have been employed to designate the same parts.

In these drawings,—

Fig. 1 is a vertical section through one embodiment of the new combined rectifier and filter, and shows the same applied to the exhaust-manifold of an internal-combustion engine;

Fig. 2 is a fragmentary, similar view on a different vertical plane;

Fig. 3 is a small or partial vertical section showing the oil connection for feeding the impure oil into the apparatus;

Fig. 4 is an elevation of the device indicating its application to an engine exhaust-manifold, shown in section, the elevation being at substantially right angles to the section plane of Fig. 1;

Figure 5 is a horizontal section, on a reduced scale, on line 5—5 of Fig. 2; and Fig. 6 shows fragmentary, horizontal sections on two different planes.

Having recourse to these drawings, it will be noted that the top wall of the exhaust-manifold 11 of the internal-combustion engine, (Figure 1), not otherwise shown, with which the combined rectifier and filter is associated for the purpose of purifying its oil while the engine is in operation, has an opening 12 therethrough, and on such manifold, the outstanding flange 13 of the main, hollow body 14 of the appliance, is fixedly and securely fastened by a number of cap-screws 15 extended through holes of the flange and taking into threaded holes in the manifold-wall around its aperture 12, as is clearly depicted in Fig. 4.

The upper, cylindrical, shell portion 16 of such member 14 forms an internal compartment 17, and the outer face of the lower, reduced-size part of such element 14 may, if desired, be equipped with outstanding, circular, cooling fins 18 to prevent an undue accumulation of heat, or, in other words, to facilitate the dissipation of some of the heat if the appliance tends to become unduly hot.

The bottom of the upright passage through such lower part of the apparatus is conveniently of the same size as and is in register with the specified manifold-opening 12, but slightly higher up, such passage is of reduced caliber at 19, forming upper and lower, circular shoulders 21 and 22, respectively.

Above such higher shoulder or ledge, the passage enlarges somewhat, and its otherwise cylindrical wall is flat at opposite points at 23, 23 (Fig. 6) to facilitate the mounting of the oil-heating element in place.

Such heat-transmitting member 24 has a similarly-flattened, external flange 25 above and bearing on an annular gasket 26 on the shoulder 21, the mating or companion, flat or plane surfaces of the two parts holding the member against turning, such element being securely held in place by means of a nut 27 screwed on to its threaded section, and bearing against the downwardly-facing shoulder 22, with an interposed gasket 28.

Thus the oil-heating element 24, of heat-conductive metal, such as copper, is firmly and rigidly secured in position in the main member 14, all as is clearly depicted in the drawings.

The upper section of the heating member 24 is formed as a cup 37, on to which is screwed a flanged cap or cover 38 with a suitable gasket 39 between the bottom face of the cover flange and the top surface of the flange 25.

A screw 41 fastens one end of a multiple, thermostatic bar 42 to the under face of such cover, the other end of the bar being apertured to receive the headed stem or shank 43 of a conical-valve 44 arranged to open and close a small port or passage 45 extended upwardly through a plug 46 screwed into a threaded hole in the cover and held in place by a lock-nut 47.

Impure oil to be reclaimed is pumped from the engine crank-case through a pipe 48 by a pump 49 and through a threaded connection 51 screwed into a hole leading to the interior of the cup 37, such member 51 extending inwardly through a passage 52 in a boss 53 forming part of the element 14; or, if preferred, a direct connection may be made with the usual oil-pressure pipe-line of the engine, in which case no extra pump is required.

The pump 49 may be considered as such common pump and the connection to the rectifier may be regarded as made to its piping system.

An inclined, oil-delivery pipe 54 connects at its lower end with the passage 45 and terminates at its upper end in a nozzle 55 substantially on the axis of the chamber 17 and of an area equaling that of the conduit 45, both of such cross-sectional areas being sufficiently small so that, even when open, the oil in the cup 37 will be at a substantial pressure due to the action of the oil-feeding pump.

The outer, slightly-tapering surface of the cap 38 has a series of spaced, lengthwise-disposed or vertical, drain channels 56, 56, and over this surface is frictionally fitted the bottom part of a conical spreader or shield 57 surrounding the pipe 54, whose nozzle 55 projects up out of the small opening at the top end of the element 57, the bottom edge or margin of the latter having an outstanding, horizontal flange 58 supporting a filter 59 having a practically-cylindrical, outer surface 61 and a corrugated, ribbed or wavy inner surface 62 to increase the exposed area thereof.

Such filter may be made of any appropriate material such as felt, wood fibre, pulp, discs or cloth, etc., and it is so made that it can readily be removed and cleaned or replaced by a fresh one.

The vessel 16 is provided with a cover 63 demountably held in place by a hinged bail 64, a sealing-gasket 65 being inserted between the cover and the top edge of the shell 16 to maintain an air-tight condition between these elements, the under side of the cover having a central, depending boss 66 to which is fastened a sheet-metal, dome-shaped spreader 67 having a plurality of extended, spring feet or fingers 68 bearing on the top edge of the filter to maintain the latter firmly in position, such part 67 between the filter-retaining feet having oil-overflow openings or gaps 69.

Through one side, the cover has a small, air-inlet port 71 equipped inside of the cover with a flat valve 72 carried on the end of a suitably-mounted leaf-spring 73 which tends to cause the valve to close the port, but which allows the valve to open readily for the entrance of external air upon the occurrence of a predetermined, small vacuum in the appliance.

Inside of the vessel 16, at one side, there is a hollow, upright rib 74, (Fig. 2), the lower end of whose passage 75 connects with a recess joined to a pipe 77 united to the intake-manifold of the engine with which the combined rectifier and filter are affiliated, or with any other convenient source of suction, whereby in some limited degree to apply the suction or subatmospheric pressure condition of the manifold to the interior of the oil purifier, the upper end of the passage 75 being joined to an upright pipe 78 having a restricted opening 79 at its top end above the oil-overflow passages 69, the size of such pipe end being so chosen as to reduce or limit the degree of suction applied to the interior of the apparatus.

As is indicated in Fig. 5, the filter and its supporting ledge 58 are cut away to avoid conflict with the parts 74 and 78.

Below the filter, the interior of the appliance is connected through an apertured boss 81 to a purified-oil discharge or delivery pipe 82 arranged to return the reclaimed oil continuously and automatically by gravity to the engine crank-case or other portion of its lubrication system.

The operation of the appliance occurs practically as follows:

When the cold engine on which the appliance is mounted is first started, suction is immediately applied to the chamber 17, the valve 44 is closed, the oil in the compartment 37 is cold and not in proper condition for filtering, the heating-element 24 is cold, and there is no oil present in the chamber 17, all of it having been previously drained therefrom through the filter while hot during or just after the previous running of the engine.

Owing to its high coefficient of heat-conductivity, the element 24 becomes rapidly heated by the exhaust, hot gases flowing through the manifold and efficiently conducts the heat to the cold oil in the cup 37.

This oil is always maintained at a substantial pressure in such cup regardless of whether the valve 44 is open or closed, due to the relation of the smallness of the openings 45 and 55 to the capacity of the oil pump 49, the latter delivering the oil into the heating chamber, through the pipe 48, the pump maintaining, but not exceeding, the customary oil pressure for the particular make of automobile involved.

As soon as the temperature of such oil under pressure reaches a predetermined amount, for which the thermostat 42 is designed or adjusted, valve 44 automatically opens inwardly or downwardly against such oil pressure and permits a part of the adequately-heated oil to be delivered through the pipe 54, but the valve soon closes again, as the incoming, cool oil through the pipe 48 reduces the temperature of the oil in chamber 37 to a point slightly below such definite or critical temperature, the valve opening again as soon as the oil reaches the required temperature and then closing anew, and so on, indefinitely, the periods of closure becoming shorter as the engine and its oil reach higher and higher temperatures.

The hot oil issuing from the nozzle 55 has its pressure very suddenly reduced by reason of the larger volume it is quickly permitted to occupy and because of the small vacuum present in such enlarged compartment.

This quick pressure decrease aids materially in liberating the oil's gaseous and easily gasifiable or vaporizable, contaminating ingredients, such as gasoline, water, etc., which are drawn by the suction, and with any admitted air, through the conduits 79, 78, 75, 76 and 77 into the engine intake-manifold, where they are economically consumed with the other incoming fuel from the carburetor.

The action of valve 72 assures that only a slight, definite vacuum shall prevail in the chamber 17 by admitting air in suitable amount to prevent the occurrence of an excessive suction or sub-atmospheric pressure, such entering air becoming mixed with the gasoline and water vapors and flowing with them into the intake-manifold for economic combustion in the engine.

The hot oil delivered through the nozzle 55 strikes the under side of the spherical-vaulted member 67 and is expanded or distributed thereby in all directions, thus aiding in freeing the oil from its objectionable liquids, gases and vapors at the same time that the pressure on the oil is reduced, and causing the thus purified oil to flow down all sides of the cone-spreader 57 and to be directed thereby outwardly toward the filter, through which it readily passes by reason of its comparatively thin consistency, due to its heat, such filtering action removing the mechanical impurities, such as carbon and dust, from the oil.

The thus doubly-purified oil flows down the discharge pipe 82 to the engine crank-case, or other part of the lubrication system of the motor, by gravity, because the suction in the chamber 17 is not of sufficient measure to prevent the gravity discharge.

Hence the admission of the air by its contact with the spread and divided oil aids in removing its gasifiable and vaporizable, objectionable constituents, and it also limits the degree of suction to permit the discharge of the reclaimed oil by gravity, consequently avoiding the necessity for the employment of any floats or valves to perform or to assist in the performance of that function.

Under normal operating conditions, the thermostatic valve more or less rapidly opens and closes continuously, although, in some cases, after the engine and rectifier have become fully heated, it may remain somewhat open all the time, but the action of the apparatus regarding the sudden release of pressure on the oil to assist in its purification remains practically the same in principle.

Intemperate or extreme heat is avoided by reason of the fact that the apparatus can dissipate heat outwardly because it is not confined or encased within a heating jacket.

It should be noted that the oil flows through the filter solely by gravity, and is not forced through under pressure nor drawn through by suction, both of which conditions would cease immediately upon the stopping of the engine, assuming that the pressure or the suction, as the case might be, was supplied by the latter, which would be the most expedient way of producing it.

In this new device the oil can as readily pass through the filter reasonably soon after the engine has ceased operation as before, because the oil is still hot and all of it drains through the filter by gravity, thus assuring that the filter will not become clogged with congealed oil or with frozen water vapors even though the appliance becomes quite cold.

The filter is, therefore, always ready for efficient action whenever the engine is started regardless of temperature conditions, and, in addition, it will be seen that the thermostatic valve insures that only oil under proper heat and physical filtering conditions will reach the filter.

Obviously, the filter will become dirty and fouled in time and require either cleaning or replacement, any one of which operations can be readily and quickly performed by taking off the cover 63 and lifting out the filter.

If, because of inattention, the filter becomes so obstructed or choked up that the oil will not pass through it in proper quantity, then the oil will accumulate inside of the filter and will overflow through the spaces 69, under which circumstances the oil will not be filtered properly, but will be otherwise purified as before.

Owing to the possible chance of such overflow occurrence, the nozzle 79 is located above the opening 69, whereby under no circumstances can any of the oil be sucked over into the engine intake-manifold.

If any very small quantity of oil finds its way inside of the spreader 57, it will readily drain through the openings 56 and be returned through the pipe 82 to the engine oil supply.

The member 57 not only directs the descending oil outwardly toward the filter, but it shields or shelters the top of the heating chamber 37 so that there is no oil in contact with it to become additionally or unduly heated.

Although one embodiment only of the invention has been illustrated and described, those who understand this art will know that the invention is susceptible of a variety of other embodiments incorporating the general principles of the invention, but varying more or less in mechanical details, the scope of the invention being defined by the following claims.

I claim:

1. In a lubricating-oil rectifier, the combination of means to maintain a body of oil under substantial pressure, means to heat such body of oil, means to suddenly release the pressure from the oil, means to conduct away the gases and vapors liberated from the oil by such quick pressure reduction, and means to discharge the purified oil.

2. In a lubricating-oil rectifier, the combination of an oil-refining compartment, an oil-heating chamber having a restricted connection with said refining-compartment, means to heat the oil in said chamber, means to feed impure oil into and maintain it at a substantial pressure in said heating chamber whereby the sudden reduction of pressure on the oil as it is delivered from said heating-chamber into said refining-compartment through said restricted connection assists in separating the gasifiable and vaporizable contaminating ingredients from said oil, means to remove the gases and vapors from said refining-compartment, and means to deliver the refined oil from said compartment.

3. In a lubricating-oil rectifier, the combination of an oil-refining compartment, an oil-heating chamber having a restricted connection with said refining-compartment, means to heat the oil in said chamber, means to feed impure oil into and maintain it at a substantial pressure in said heating-chamber whereby the sudden reduction of pressure on the oil as it is delivered from said heating-chamber into said refining-compartment through said restricted connection assist in separating the gasifiable and vaporizable contaminating ingredients from said oil, means to remove the gases and vapors from said refining-compartment, and means to deliver the refined oil from said compartment continuously.

4. In a lubricating-oil rectifier, the combination of an oil-refining compartment, an oil-heating chamber having a restricted connection with said refining-compartment, means to heat said chamber, means to feed oil into and maintain it at a substantial pressure in said heating-chamber whereby the sudden reduction of pressure on the oil as it is delivered from said heating-chamber into said refining-compartment through said restricted connection assists in separating the gasifiable and vaporizable contaminating ingredients from said oil, suction means to remove the gases and vapors from said refining-compartment, means to deliver the refined oil from said compartment, and means to admit air into said refining-compartment permitting said oil-delivery means to effect such delivery by gravity.

5. In a lubricating-oil rectifier, the combination of an oil-refining compartment, an oil-heating chamber having a restricted connection with said refining-compartment, means to heat the oil in said chamber, means to feed oil into and maintain it at a substantial pressure in said heating-chamber whereby the sudden reduction of pressure on the oil as it is delivered from said heating chamber into said refining-compartment through said restricted connection assists in separating the gasifiable and vaporizable contaminating ingredients from the oil, a valve controlling said connection, a thermostat governing the action of said valve and subject to the heat condition of said oil in said heating-chamber, means to remove the gases and vapors from said refining-compartment, and means to deliver the refined oil from said compartment.

6. In a lubricating-oil rectifier, the combination of an oil-refining compartment, an oil-heating chamber having a restricted connection with said refining-compartment, means to heat the oil in said chamber, means to feed oil into and maintain it at a substantial pressure in said heating-compartment whereby the sudden reduction of pressure on the oil as it is delivered from said heating-chamber into said refining-compartment through said restricted connection assists in separating the gasifiable and vaporizable contaminating ingredients from the oil, a valve controlling said connection, a thermostat governing the action of said valve and subject to the heat condition of the oil in said heating-chamber and adapted to hold said valve closed until the oil in said chamber has been raised to a predetermined temperature, suction means to remove the gases and vapors from said refining-compartment, means to deliver the refined oil from said compartment continuously by gravity, and means to admit air into said refining-compartment permitting said oil-delivery means to operate in the specified manner.

7. In a lubricating-oil rectifier, the combination of an oil-refining compartment, an oil-heating chamber having a restricted connection with said refining-compartment, means to heat the oil in said chamber, means to feed impure oil into and maintain it at a substantial pressure in said heating-chamber, means to maintain the temperature of the oil delivered from said heating-chamber into said refining-compartment substantially constant, means to remove the gases and vapors from said refining-compartment, and means to deliver the refined oil from said compartment.

8. In a combined oil rectifier and filter, the combination of an oil-heating chamber, means to heat said chamber, an oil-filtering-compartment connected to said chamber, an oil-filter in said compartment through which the oil flows by gravity only, means to feed oil into said chamber, means to permit oil only at a predetermined temperature to pass from said chamber into said compartment, and means to deliver the filtered oil from said filter-compartment.

9. In a combined oil rectifier and filter, the combination of an oil-heating chamber, means to heat said chamber, an oil-filtering compartment connected to said chamber, an oil-filter in said compartment through which the oil flows by gravity only, means to feed oil into said chamber, means to permit oil only at a predetermined temperature to pass from said chamber into said compartment, and means to deliver the filtered oil by gravity only from said filter-compartment.

10. In a combined oil rectifier and filter, the combination of an oil-heating chamber, means to heat said chamber, an oil-filtering compartment connected to said chamber, an oil-filter in said compartment through which the oil flows by gravity only, means to feed oil into and maintain it at a substantial pressure in said heating-chamber, means to permit oil only at a predetermined temperature to pass from said chamber into said compartment, and means to deliver the filtered oil by gravity only from said filter-compartment.

11. In a combined oil rectifier and filter, the combination of an oil-heating chamber, means to heat said chamber, an oil-filtering compartment connected to said chamber through a restricted passage, an oil-filter in said compartment through which the oil flows by gravity only, means to feed impure oil into and maintain it at a substantial pressure in said heating chamber, means to permit oil only at a predetermined temperature to pass from said chamber into said compartment with a sudden reduction of pressure thereon in making such passage, means to remove the gases and vapors liberated from the oil from said compartment, and means to deliver the filtered oil by gravity only from said filter-compartment.

12. In a combined oil rectifier and filter, the combination of an oil-heating chamber, means to heat said chamber, an oil-filtering compartment connected to said chamber through a restricted passage, an oil-filter in said compartment through which the oil flows by gravity only, means to feed impure oil into and maintain it at a substantial pressure in said heating-chamber, means to permit oil only at a predetermined temperature to pass from said chamber into said compartment with a sudden reduction in pressure thereon in making such passage, means to remove the gases and vapors liberated from the oil from said compartment by suction insufficient to prevent the gravity delivery of the oil, and means to deliver the filtered oil by gravity only from said filter-compartment.

13. In a combined oil rectifier and filter, the combination of an oil-heating chamber, means to heat said chamber, an oil-filtering compartment connected to said chamber through a restricted passage, an oil-filter in said compartment through which the oil flows by gravity only, means to feed impure oil into and maintain it at a substantial pressure in said heating-chamber, means to permit oil only at a predetermined temperature to pass from said chamber into said compartment with a sudden reduction in pressure thereon in making such passage, means to remove the gases and vapors liberated from the oil from said compartment by means connecting the latter to the intake-manifold of the internal-combustion engine with which the appliance is associated, means to deliver the refined filtered oil by gravity only from said filter-compartment, and means to admit air into said compartment to facilitate the purification of the oil by its contact therewith and to maintain a sufficiently reduced vacuum in the compartment to permit the specified gravity delivery of the reclaimed oil.

14. In a combined oil rectifier and filter, the combination of an oil-refining compartment, an oil-heating chamber inside of said compartment, means to heat said chamber, a hollow filter around at least a part of said chamber, means to feed impure oil into said chamber, means to deliver heated oil from said chamber inside of said filter, means to deliver the filtered oil from said compartment, and means to permit the oil to by-pass around said filter in case the latter becomes clogged.

15. In a combined oil rectifier and filter, the combination of an oil-refining compartment, an oil-heating chamber inside of said compartment, means to heat said chamber, a hollow filter around at least a part of said chamber, means to feed impure oil into said chamber, a dome-shaped member inside of said compartment, a cone-shaped spreader inside of said filter and below said member, means to deliver the heated oil from said chamber against the under side of said member from which it flows down on the outside of said spreader and passes through the filter, and means to deliver the filtered oil from said compartment.

In witness whereof I have hereunto set my hand.

RALPH L. SKINNER.